(12) United States Patent
Pratt et al.

(10) Patent No.: US 8,377,516 B2
(45) Date of Patent: *Feb. 19, 2013

(54) PRINTING INK

(75) Inventors: Gareth Pratt, Broadstairs Kent (GB); Nigel Gould, Broadstairs (GB)

(73) Assignee: Sericol Limited (GB)

( * ) Notice: Subject to any disclaimer, the term of this patent is extended or adjusted under 35 U.S.C. 154(b) by 389 days.

This patent is subject to a terminal disclaimer.

(21) Appl. No.: 12/593,071

(22) PCT Filed: Mar. 26, 2008

(86) PCT No.: PCT/GB2008/050219
§ 371 (c)(1),
(2), (4) Date: Mar. 29, 2010

(87) PCT Pub. No.: WO2008/117092
PCT Pub. Date: Oct. 2, 2008

(65) Prior Publication Data
US 2010/0189965 A1 Jul. 29, 2010

(30) Foreign Application Priority Data
Mar. 27, 2007 (GB) .................................. 0705878.7

(51) Int. Cl.
*C09D 11/00* (2006.01)
*C09D 11/10* (2006.01)
*B05D 1/32* (2006.01)
*B32B 27/00* (2006.01)

(52) U.S. Cl. .................. 427/466; 428/423.1; 428/424.8; 522/75; 522/167; 522/173; 523/160

(58) Field of Classification Search .................. 522/75, 522/167, 173; 427/466; 428/423.1, 424.8; 523/160
See application file for complete search history.

(56) References Cited

U.S. PATENT DOCUMENTS

| 7,037,952 | B2 * | 5/2006 | Itoh et al. ........................... 522/6 |
| 7,837,318 | B2 * | 11/2010 | Cohen et al. .................. 347/100 |
| 8,133,935 | B2 * | 3/2012 | Ward et al. ..................... 523/160 |
| 8,133,936 | B2 * | 3/2012 | Ward et al. ..................... 523/160 |
| 8,133,937 | B2 * | 3/2012 | Ward et al. ..................... 523/160 |
| 2002/0086914 | A1 | 7/2002 | Lee et al. |
| 2004/0242727 | A1 * | 12/2004 | Carlson et al. ................ 523/160 |

FOREIGN PATENT DOCUMENTS

| EP | 1 642 943 A2 | 4/2001 |
| WO | 98/27171 A1 | 6/1998 |
| WO | 99/29788 A1 | 6/1999 |
| WO | 02/38687 A1 | 5/2002 |
| WO | 02/38688 A2 | 5/2002 |
| WO | 02/061002 A2 | 8/2002 |
| WO | 03/010249 A1 | 2/2003 |

OTHER PUBLICATIONS

"UK Search Report, Patents Act 1977: Search Report under Section 17(5)", dated Aug. 1, 2007, for GB0705878.7, 5pgs.
"PCT International Search Report", dated Jun. 30, 2008 for PCT/GB2008/050219, 3pgs.

* cited by examiner

*Primary Examiner* — Susan W Berman
(74) *Attorney, Agent, or Firm* — Wood, Phillips, Katz, Clark & Mortimer

(57) ABSTRACT

This invention relates to a radiation-curable ink-jet ink having a viscosity of 30 mPas or less at 25° C., the ink comprising: at least two monofunctional (meth)acrylate monomers which comprise a cyclic monofunctional (meth)acrylate monomer and 2-(2-ethoxyethoxy)ethyl acrylate; a monofunctional monomer selected from an N-vinyl amide, an N-acryloyl amine or a mixture thereof; a multifunctional (meth)acrylate monomer; a polymerisable (meth)acrylate oligomer; a radical photoinitiator; and a colouring agent. The ink is preferably used in reel-to-reel printing and in printing where the substrates are stacked.

35 Claims, 1 Drawing Sheet

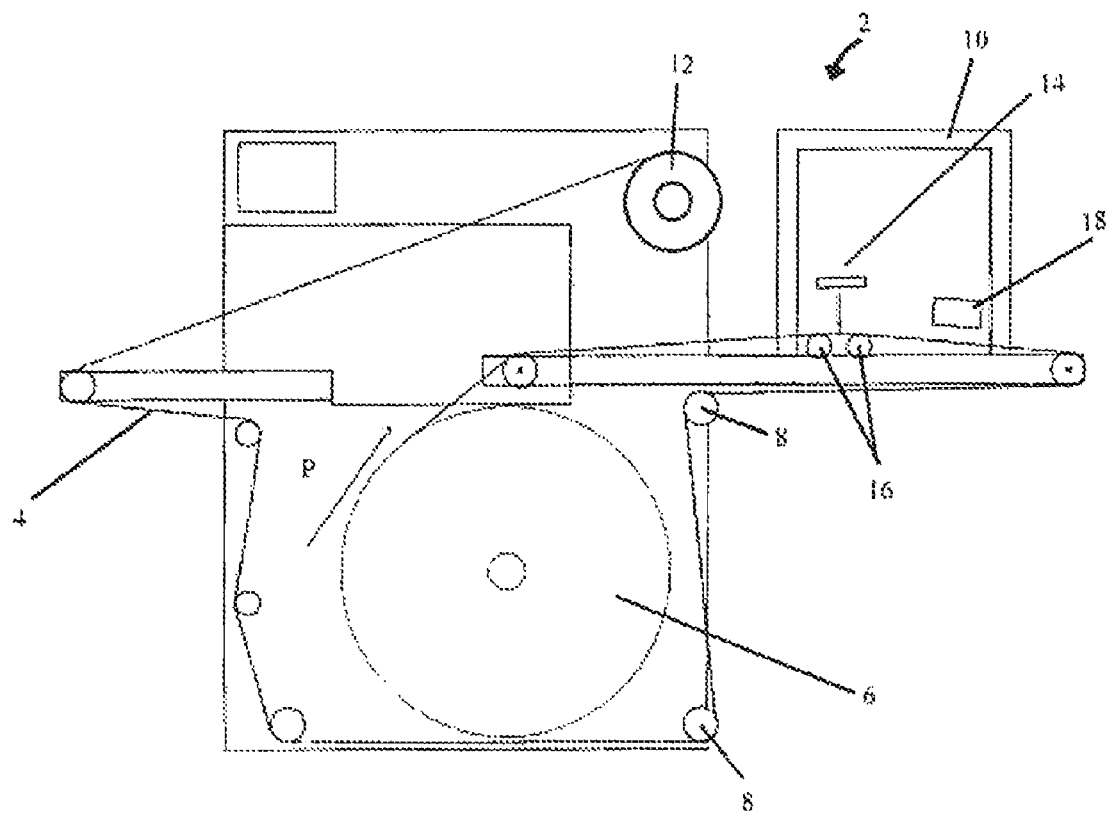
(Prior Art)

PRINTING INK

This application is a U.S. National Stage filing under 35 U.S.C. §371 and 35 U.S.C §119, based on and claiming priority to PCT/GB2008/050219 for "A PRINTING INK" filed Mar. 26, 2008, claiming priority to GB Patent Application No. 0705878.7 filed 27 Mar. 2007.

This invention relates to a printing ink and in particular to inks for use in applications where blocking is an issue, such as reel-to-reel ink-jet printing.

In ink-jet printing, minute droplets of black, white or coloured ink are ejected in a controlled manner from one or more reservoirs or printing heads through narrow nozzles on to a substrate which is moving relative to the reservoirs. The ejected ink forms an image on the substrate. For high-speed printing, the inks must flow rapidly from the printing heads and, to ensure that this happens, they must have in use a low viscosity, typically no more than 100 mPas (cP) at 25° C. although in most applications the viscosity should be no more than 50 mPas, and often no more than 30 mPas. Typically, when ejected through the nozzles, the ink has a viscosity of less than 25 mPas, preferably 10-12 mPas and ideally 10.5 mPas at the jetting temperature which is often elevated to about 40° C. (the ink might have a much higher viscosity at ambient temperature). The inks must also be resistant to drying or crusting in the reservoirs or nozzles.

For these reasons, ink-jet inks for application at or near ambient temperatures are commonly formulated to contain a large proportion of a mobile liquid vehicle or solvent. In one common type of ink jet ink this liquid is water—see for example the paper by Henry R. Kang in the Journal of Imaging Science, 35(3), pp. 179-188 (1991). In those systems, great effort must be made to ensure the inks do not dry in the head due to water evaporation. In another common type the liquid is a low-boiling solvent or mixture of solvents—see, for example, EP 0 314 403 and EP 0 424 714. Unfortunately, ink jet inks that include a large proportion of water or solvent cannot be handled after printing until the inks have dried, either by evaporation of the solvent or its absorption into the substrate. This drying process is often slow and in many cases (for example, when printing on to a heat-sensitive substrate such as paper) cannot be accelerated.

Another type of ink-jet ink of the type used in the present invention contains unsaturated organic compounds, termed monomers, which polymerise by irradiation, commonly with ultraviolet light, in the presence of a photoinitiator. This type of ink has the advantage that it is not necessary to evaporate the liquid phase to dry the print; instead the print is exposed to radiation to cure or harden it, a process which is more rapid than evaporation of solvent at moderate temperatures. In such ink-jet inks it is necessary to use monomers possessing a low viscosity.

Reel-to-reel printing places particular demands on the ink-jet ink. FIG. 1 shows a reel-to-reel printer 2. A substrate 4 is tightly wound on a substrate reel 6. The substrate reel 6 is caused to move in order to deliver the substrate 2, via guide reels 8, to the ink-jet printing station 10. The substrate 2 moves in the print direction P shown by the arrow. At the printing station 10, the ink is applied by printhead 14 shown schematically in FIG. 1. The stabilising reels 16 are positioned to provide a stable web onto which the ink is applied. As the substrate passes through the printing station 10, the ink is cured by a UV drier 18. The substrate 2 is subsequently accumulated on the receiving reel 12.

Reel-to-reel printing is a continuous process and therefore the substrate, and hence the ink printed thereon, only makes one pass under the radiation source, i.e. reel-to-reel printing is a single pass application. This results in the ink receiving a low dose of radiation, but at the same time the ink must cure quickly because of the speed at which the substrate travels from reel to reel. In addition, low-power pinning lamps are used between each printhead colour application (inter-colour pinning) since low power is needed to achieve dot gain requirements.

Since reel-to-reel printing is a single pass application, there is only one opportunity to achieve colour saturation. For this reason, high pigment loadings and/or high film weights are required. This places further demands on the nature of the radiation-curable components as high pigment loading and high film weights both work against absorption of the radiation by the components of the ink.

A consequence of reel-to-reel printing is that the substrate 2 is gathered on the receiving reel 12. The accumulation of layer upon layer of printed substrate causes significant temperatures and pressures to develop in the receiving reel and, as a result, the ink has a tendency to cause blocking, i.e. the ink has a tendency to cling to the unprinted side of the substrate 2 as the receiving reel 12 is unwound. Avoidance of blocking is therefore essential in reel-to-reel printing inks.

It has also been found that the same problem occurs in automated and semi-automated printing processes using a flat-bed ink-jet printer where the substrate is loaded into the printer and the printer then prints and stacks the printed substrates upon one another. With automated processes, a significant pressure may build up under the weight of the printed substrates. Again, avoidance of blocking is therefore essential in printing inks designed for automated and semi-automated processes.

However, despite avoiding blocking, the ink must of course be capable of adhering to the substrate being printed which places competing demands on the ink formulation. Typical substrates are polyolefins, such as polypropylene and polyethylene, both with and without a topcoat which represent a further challenge for the ink formulator.

Against this background, the ink jet ink must also satisfy the requirement of low viscosity which, as described above, is a general requirement for ink-jet inks. Achieving a low viscosity can be a particular challenge at high pigment loadings. The addition of oligomers, an essential component for enhancing scratch resistance, also tends increase viscosity.

There are therefore a number of competing factors in trying to formulate ink-jet inks suitable for reel-to-reel printing and other printing processes where blocking may be an issue, particularly on to polyolefin substrates. There remains a requirement in the art, therefore, for inks which achieve a balance between the competing factors of viscosity, cure speed, adhesion range and blocking resistance.

Accordingly, the present invention provides a radiation-curable ink-jet ink having a viscosity of 30 mPas or less at 25° C., the ink comprising:

at least two monofunctional (meth)acrylate monomers which comprise a cyclic monofunctional (meth)acrylate monomer and 2-(2-ethoxyethoxy)ethyl acrylate;
a monofunctional monomer selected from an N-vinyl amide, an N-acryloyl amine or a mixture thereof;
a multifunctional (meth)acrylate monomer;
a polymerisable (meth)acrylate oligomer;
a radical photoinitiator; and
a colouring agent.

It has been found that these factors can be balanced by the careful selection of the above-described components of the ink-jet ink formulation.

The present invention will now be described with reference to the drawing, in which FIG. 1 shows a printer for reel-to-reel printing.

The present invention is directed primarily to an ink-jet ink suitable for reel-to-reel printing and the printer described hereinabove with reference to FIG. 1 is suitable for use with the present ink.

The ink jet ink of the present invention dries primarily by curing, i.e. by the polymerisation of the monomers and oligomers present, as discussed hereinabove, and hence is a radiation-curable ink. The ink does not, therefore, require the presence of water or a volatile organic solvent to effect drying of the ink, although the presence of such components may be tolerated. Preferably, however, the ink jet ink of the present invention is substantially free of water and volatile organic solvents.

As explained hereinabove, the ink formulator faces significant challenges in formulating ink-jet inks for reel-to-reel printing applications and applications where similar pressure is applied to the printed substrate. It has now been found that combinations of certain monofunctional (meth)acrylate monomers, N-vinyl amide and/or N-acryloyl amine monomers, a mulitfunctional (meth)acrylate monomer and a polymerisable (meth)acrylate oligomer provide an excellent balance of viscosity, cure speed, adhesion range and blocking resistance.

The total amount of the at least two monofunctional (meth)acrylate monomers and the at least one monofunctional monomer selected from an N-vinyl amide, an N-acryloyl amine or a mixture thereof is preferably at least 25 wt % based on the total weight of the ink.

The cyclic monofunctional (meth)acrylate monomer is composed of an ester of acrylic or methacrylic acid in which the alcohol moiety is cyclic, i.e. the radical covalently bonded to the oxygen atom of the (meth)acrylate unit is cyclic. The cyclic radical may be saturated or unsaturated, including aromatic. The substituents are typically cycloalkyl, aryl and combinations thereof, any of which may be interrupted by heteroatoms. Non-limiting examples of substituents commonly used in the art include $C_{3-18}$ cycloalkyl, $C_{6-10}$ aryl and combinations thereof, such as $C_{6-10}$ aryl- or $C_{3-18}$ cycloalkyl-substituted $C_{1-18}$ alkyl, any of which may be interrupted by 1-10 heteroatoms, such as oxygen or nitrogen, with nitrogen further substituted by any of the above described substituents. Preferred cyclic monofunctional (meth)acrylates include the following monomers and mixtures thereof:

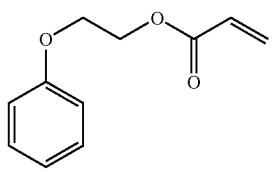

Phenoxyethyl acrylate (PEA)
mol wt 192

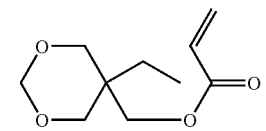

Cyclic TMP formal acrylate (CTFA)
mol wt 200

-continued

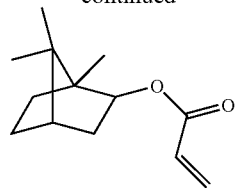

Isobornyl acrylate (IBOA)
mol wt 208

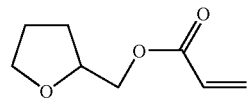

Tetrahydrofurfuryl acrylate (THFA)
mol wt 156

CTFA and PEA are preferred and PEA is particularly preferred in the ink-jet ink of the present invention. Thus, in a preferred embodiment, the present invention provides a radiation-curable ink-jet ink having a viscosity of 30 mPas or less at 25° C., the ink comprising: at least two monofunctional (meth)acrylate monomers which comprise a cyclic monofunctional (meth)acrylate monomer selected from CTFA and PEA, and 2-(2-ethoxyethoxy)ethyl acrylate; a monofunctional monomer selected from an N-vinyl amide, an N-acryloyl amine or a mixture thereof; a multifunctional (meth)acrylate monomer; a polymerisable (meth)acrylate oligomer; a radical photoinitiator; and a colouring agent.

The total amount of the cyclic monofunctional (meth)acrylate monomer in the ink is preferably from 10 to 25 wt %, based on the total weight of the ink.

2-(2-Ethoxyethoxy)ethyl acrylate (EOEOEA) is a known monomer; it has a molecular weight of 188 and has the following formula:

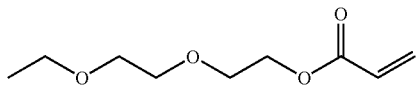

The total amount of 2-(2-ethoxyethoxy)ethyl acrylate in the ink is preferably from 5 to 15 wt %, based on the total weight of the ink.

N-Vinyl amides are well-known monomers in the art and a detailed description is therefore not required. N-Vinyl amides have a vinyl group attached to the nitrogen atom of an amide which may be further substituted in an analogous manner to the (meth)acrylate monomers.

Preferred examples are N-vinyl caprolactam (NVC) and N-vinyl pyrrolidone (NVP):

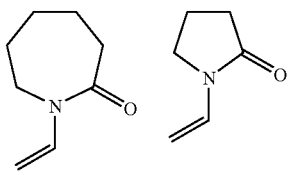

with NVC being particularly preferred.

Similarly, N-acryloyl amines are also well-known in the art. N-Acryloyl amines also have a vinyl group attached to an amide but via the carbonyl carbon atom and again may be further substituted in an analogous manner to the (meth)acrylate monomers.

Regarding the nomenclature, since the term "acryloyl" incorporates a carbonyl group, the amide is actually named as an amine.

A preferred example is N-acryloylmorpholine (ACMO):

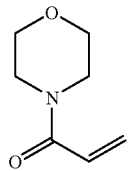

Thus, the monomer selected from an N-vinyl amide, an N-acryloyl amine or a mixture thereof, is preferably selected from N-vinyl caprolactam (NVC), N-vinyl pyrrolidone (NVP), N-acryloylmorpholine (ACMO) and mixtures thereof. The monomer selected from an N-vinyl amide, an N-acryloyl amine or a mixture thereof, is preferably present in the ink at a total amount of from 10 to 25 wt % based on the total weight of the ink.

The ink of the present invention also comprises a multifunctional (meth)acrylate monomer. Such monomers are well known in the art and have a functionality of two or higher and typically having a viscosity of less than 2 mPas at 25° C. and a molecular weight of less than 450. Functionalities of two, three or four are preferred and preferably this monomer is a difunctional monomer. Preferred multifunctional (meth) acrylate monomers include dipropylene glycol diacrylate (DPGDA), hexanediol diacrylate (HDDA), tripropylene glycol diacrylate (TPGDA), propoxylated neopentyl glycol diacrylate (NPG(PO)DA) and mixtures thereof; a particularly preferred multifunctional (meth)acrylate monomer is dipropylene glycol diacrylate (DPGDA).

The total amount of the multifunctional (meth)acrylate monomer is from 5 to 15 wt % based on the total weight of the ink The ink also contains a polymerisable (i.e. curable) (meth) acrylate oligomer. The term "polymerisable oligomer" has its standard meaning in the art, namely that the component is partially reacted to form a pre-polymer having a plurality of repeating monomer units which is capable of further polymerisation. The oligomer is a curable, e.g. UV-curable, (meth)acrylate. The oligomer preferably has a molecular weight of at least 450. The molecular weight is preferably 4,000 or less, more preferably from 2,000 or less and most preferably 1500 or less. The degree of functionality of the oligomer determines the degree of crosslinking and hence the properties of the cured ink. The oligomer is preferably multifunctional meaning that it contains on average more than one reactive functional group per molecule. The average degree of functionality is preferably from 2 to 6, more preferably 2 to 4 and most preferably 3.

UV-curable oligomers of this type are well known in the art. The oligomer is preferably based on bisphenol A, a polyester, a polyether, an amine-modified polyester, an amine-modified polyethers or a urethane. Examples include Ebecryl® 81 and Ebecryl® 83 supplied by UCB Chemicals, and LR8869 and LR8996 supplied by BASF. A particularly preferred example is Ebecryl® 81 which is a polyether-acrylate oligomer having an average of 3 acrylate functional groups per molecule and a molecular weight of 600.

The total amount of the polymerisable (meth)acrylate oligomer is preferably from 5 to 35 wt % and most preferably from 15 to 30 wt %, based on the total weight of the ink.

Monomers may be distinguished from the oligomers on account of the lack of repeat units. The monomers typically have a molecular weight of less than 450 and more often less than 300.

It has been found that the above-described combination of a cyclic monofunctional (meth)acrylate monomer, 2-(2-ethoxyethoxy)ethyl acrylate, an N-vinyl amide and/or an N-acryloyl amine, a multifunctional (meth)acrylate monomer and a polymerisable (meth)acrylate oligomer provides an ink which has the desired properties for reel-to-reel printing and the like. It has been further found that the ink is preferably substantially free of acyclic-hydrocarbon monofunctional (meth)acrylate monomers. By substantially free is meant that trace amounts may be tolerated but this component is preferably avoided. Acyclic-hydrocarbon monofunctional (meth) acrylate monomers are known in the art and are composed of an ester of acrylic or methacrylic acid in which the alcohol moiety is an acyclic hydrocarbon, i.e. the radical covalently bonded to the (meth)acrylate unit is an acyclic hydrocarbon. The acyclic-hydrocarbon radical may be saturated or unsaturated and contains no heteroatoms. The alkyl group is typically a $C_{6-20}$ alkyl group and common examples include octadecyl acrylate (ODA), tridecyl acrylate, isodecyl acrylate (IDA) and lauryl acrylate.

It is surprising that the selection of 2-(2-ethoxyethoxy) ethyl acrylate as the monofunctional (meth)acrylate monomer provides such improved properties over other monofunctional (meth)acrylate monomers and particularly over acyclic-hydrocarbon monofunctional (meth)acrylate monomers which are structurally similar and have similar physical properties. For example, ODA and EOEOEA have similar molecular weights of 200 and 188, respectively, and similar glass transition temperatures for the homopolymers of −65° C. and −54° C., respectively. However, as set out in the examples hereinbelow, EOEOEA outperforms ODA in reel-to-reel printing applications.

In addition to the components described hereinabove, the compositions include a photoinitiator which, under irradiation, for example by ultraviolet light, initiates the polymerisation of the monomers. Preferred are photoinitiators which produce free radicals on irradiation (free radical photoinitiators), such as benzophenone, 1-hydroxycyclohexyl phenyl ketone, 2-benzyl-2-dimethylamino-(4-morpholinophenyl) butan-1-one, benzyl dimethylketal, bis(2,6-dimethylbenzoyl)-2,4,4-trimethylpentylphosphine oxide or mixtures thereof. Such photoinitiators are known and commercially available such as, for example, under the trade names Irgacure, Darocur (from Ciba) and Lucerin (from BASF).

Preferably the photoinitiator is present from 1 to 20% by weight, more preferably from 5 to 15% by weight, based on the total weight of the ink.

The wavelength of the radiation and the nature of the photoinitiator system used must of course coincide. The ink is cured by irradiation with actinic radiation, such as UV, x-ray, electron beam etc, although UV-curing is preferred.

The ink-jet ink of the present invention also includes a colouring agent, which may be either dissolved or dispersed in the liquid medium of the ink. Preferably the colouring agent is a dispersible pigment. Commercially available colouring agents include those sold under the trade-names Paliotol (available from BASF p1c), Cinquasia, Irgalite (both available from Ciba Speciality Chemicals) and Hostaperm (available from Clariant UK). The pigment may be of any desired colour such as, for example, Pigment Yellow 13, Pigment Yellow 83, Pigment Red 9, Pigment Red 184, Pigment Blue 15:3, Pigment Green 7, Pigment Violet 19, Pigment Black 7. Especially useful are black and the colours required for trichromatic (CYM) process printing. Mixtures of pigments may be used.

The total proportion of pigment present is preferably from 0.5 to 15% by weight, more preferably from 1 to 10% by weight, based on the total weight of the ink.

Although the ink of the present invention cures by a free radical mechanism, the ink of the present invention may also be a so-called "hybrid" ink which cures by a radical and cationic mechanism. The ink-jet ink of the present invention, in one embodiment, therefore further comprises at least one cationically curable monomer, such as a vinyl ether, and at least one cationic photoinitiator, such as an iodonium or sulfonium salt, e.g. diphenyliodonium fluoride and triphenylsulfonium hexafluophosphate. Suitable cationic photoinitiators include the Union Carbide UV1-69-series, Deuteron UV 1240 and BY2257, Ciba Irgacure 250 and CGI 552, IGM-C440, Rhodia 2047 and UV9380c.

Other components of types known in the art may be present in the ink to improve the properties or performance. These components may be, for example, surfactants, defoamers, dispersants, synergists for the photoinitiator, stabilisers against deterioration by heat or light, reodorants, flow or slip aids, biocides and identifying tracers.

The present invention also provides a method of ink-jet printing using the above-described ink and a substrate having the cured ink thereon. Advantageously, the ink may be used in reel-to-reel ink-jet printing. Accordingly, the present invention also provides a method of reel-to-reel ink jet printing comprising printing the ink-jet ink as described herein on to a substrate and curing the ink as the substrate is caused to move from a substrate reel to a receiving reel. Alternatively, the ink may be used in an automated or semi-automated process where the printed substrates are stacked one on top of another. Accordingly, the present invention also provides a method of ink-jet printing, comprising providing an ink jet printer with a plurality of substrates, printing the ink-jet ink as defined herein on to a plurality of the substrates, curing the ink on each of the substrates to produce printed substrates, and stacking the printed substrates. Preferably the printer is a flat-bed ink-jet printer. The process may be semi-automated in that the substrates are fed manually in to the printer, or automated where the printer contains a substrate-storage facility having a plurality of substrates held therein.

Suitable substrates include polyolefin substrates, such as polyethylene and polypropylene, e.g. PE85 Trans TIC, PE85 White or PP Top White, polyethylene terephthalate (PET) and paper. Polyolefin substrates represent the most difficult of these substrates on which to gain adhesion.

The present invention also provides the use of the ink-jet ink as defined herein in applications which tend to cause blocking, i.e. where a block is formed comprising alternating layers of substrate and ink in contact with each other.

The ink of the present invention is cured by actinic, preferably ultraviolet, irradiation and is suitable for application by ink jet printing.

The ink-jet ink exhibits a desirable low viscosity, i.e. 30 mPas or less, preferably 25 mPas or less and most preferably 22 mPas or less at 25° C. Viscosity may be determined using a Brookfield DV-I+ running at 20 rpm.

(Meth)acrylate is intended herein to have its standard meaning, i.e. acrylate and/or methacrylate. Mono and multifunctional are also intended to have their standard meanings, i.e. "one" and "two or more" groups, respectively, which take part in the polymerisation reaction on curing. The substituents of the monofunctional and multifunctional monomers are not further limited other than by the constraints imposed by the use in an ink-jet ink, such as viscosity, stability, toxicity etc.

The inks of the invention may be prepared by known methods such as, for example, stirring with a high-speed water-cooled stirrer, or milling on a horizontal bead-mill.

EXAMPLES

The invention will now be described, by way of example, with reference to the following example (parts given are by weight).

Example 1

Inks 1-5 were prepared by combining the following components:

| Component | Wt % | Function |
|---|---|---|
| N Vinyl caprolactam | 16.10 | Vinyl amide monomer |
| 2 Phenoxy ethylacrylate | 16.91 | Cyclic monofunctional monomer |
| Monomer* | 9.90 | Monofunctional monomer |
| DPGDA | 10.00 | Difunctional monomer |
| Black pigment concentrate | 5.29 | Pigment |
| Irgacure 369 | 1.00 | Photoinitiator |
| PBZ | 4.00 | Photoinitiator |
| Irgacure 907 | 0.40 | Photoinitiator |
| Irgacure 184 | 2.00 | Photoinitiator |
| TPO | 4.50 | Photoinitiator |
| ST-1 | 0.80 | UV stabiliser |
| BYK 307 | 0.10 | Silicone jetting aid |
| Ebecryl 81 | 29.00 | Difunctional acrylate oligomer |
| Total | 100.00 | |

*The additional monomer is:
Ink 1: PEA (Comparative)
Ink 2: PEA/TPO (Comparative)
Ink 3: DVE-3 (Comparative)
Ink 4: ODA (Comparative)
Ink 5: EOEOEA (Invention)

Example 2

The viscosity of the inks 1-5 prepared in Example 1 was measured and the inks were subsequently applied to a substrate and analysed. Viscosity was measured on a Brookfield DV-I+ running at 20 rpm. The inks were drawn down onto to a 220 μm Genotherm (PVC) substrate using an M10 K bar applicator to give a film weight of approximately 8-10 μm. The films were cured using a Svecia UV drier fitted with two 80 W/cm lamps operating at full power with a belt speed of 20 m/min. The prints were left 15 hours after curing before the film properties were assessed. The results are shown in the following table:

| | Ink | | | | |
|---|---|---|---|---|---|
| | 1 | 2 | 3 | 4 | 5 |
| Monomer | PEA | PEA/TPO | DVE-3 | ODA | EOEOEA |
| Viscosity (mPas @ 25° C.) | 26.0 | 33.4 | 21.1 | 19.7 | 21.7 |

The base formulation of inks 1-5 as defined in Example 1 contains 29.00 wt % of the difunctional acrylate oligomer, Ebecryl 81. This relatively high level of oligomer leads to a significant rise in the viscosity of the base formulation. The viscosity reduction for inks 1 and 2 using more PEA (ink 1) and more PEA combined with TPO (ink 2) does not provide a sufficiently significant reduction in viscosity for these monomers to find application in reel-to-reel printing applications. However, the addition of DVE-3 (ink 3), ODA (ink 4) and EOEOEA (ink 5) provides a reduction in viscosity down to 21.1, 19.7 and 21.7 mPas, respectively, which is a sufficient reduction in viscosity.

Example 3

The adhesion of the inks 1-5 prepared in Example 1 was measured. The inks were cured under the conditions set out in Example 2 except that the substrates PE85 Trans TIC, PE85 White and PP Top White were used, as set out in the following table. The adhesion to these three different substrates was measured using tape adhesion from a cut edge. The sample print was scored through with a sharp knife and then adhesive tape was applied horizontally across the cut edges. The tape was then removed with a rapid tug and the degree of ink removal was assessed. The results are shown in the following table in which "1" represents 100% removal of the cured ink and "5" represents 0% removal.

As may be seen from the results achieved using PE85 White as the substrate, DVE-3 does not provide sufficient adhesion.

Example 4

The blocking of the inks 1-5 prepared in Example 1 was measured. Coatings of 1, 2 and 3 layers were blocked both print-to-print and print-to-substrate under a 20 Kg weight for 15 hours before being assessed for the degree of blocking. Although both print-to-print and print-to-substrate blocking were determined, for reel-to-reel printing applications only print-to-substrate is of particular relevance since the rolls formed will necessary be formed print-to-substrate. The results are shown in the following table in which "1" represents poor blocking performance and "5" represents excellent performance.

| Ink | Monomer | Layer | Print-to-print | Print-to-substrate |
|---|---|---|---|---|
| 1 | PEA | 1 layer | 4 | 4 |
|   |   | 2 layer | 3 | 4 |
|   |   | 3 layer | 3/4 | 4 |
| 2 | PEA + TPO | 1 layer |   |   |
|   |   | 2 layer | 4 | 4 |
|   |   | 3 layer | 4 | 4 |

|   |   |   | Ink |   |   |   |   |
|---|---|---|---|---|---|---|---|
|   |   |   | 1 | 2 | 3 | 4 | 5 |
| Monomer |   |   | PEA | PEA/TPO | DVE-3 | ODA | EOEOEA |
| Substrate and % corona treatment* | PE85 Trans T/C | 0 | 3 | 3 | 3 | 3 | 3 |
|   |   |   | 3 | 3 | 3 | 3 | 3 |
|   |   |   | 3 | 3 | 3 | 3 | 3 |
|   |   | 20 | 3 | <u>5</u> | 3-4 | <u>5</u> | <u>5</u> |
|   |   |   | 3 | 5 | <u>5</u> | 5 | 5 |
|   |   |   | 3 | 5 | 5 | 5 | 5 |
|   |   | 80 | <u>5</u> | <u>5</u> | <u>5</u> | <u>5</u> | <u>5</u> |
|   |   |   | <u>5</u> | <u>5</u> | <u>5</u> | <u>5</u> | <u>5</u> |
|   |   |   | 5 | 5 | 5 | 5 | 5 |
|   |   | 100 | <u>5</u> | <u>5</u> | <u>5</u> | <u>5</u> | <u>5</u> |
|   |   |   | <u>5</u> | 5 | 5 | <u>5</u> | <u>5</u> |
|   |   |   | 5 | 5 | 5 | 5 | 5 |
|   | PE85 White | 0 | 1 | 3 | 2-3 | 1 | 1-2 |
|   |   |   | 1 | 3 | 2-3 | 1 | 1-2 |
|   |   |   | 1 | 3 | 2-3 | 1 | 1-2 |
|   |   | 20 | 1 | 3 | 3 | 3 | 3 |
|   |   |   | 1 | 3 | 3 | 3 | 3 |
|   |   |   | 1 | 3 | 3 | 3 | 3 |
|   |   | 80 | 4 | 4 | 3 | 3-4 | 3-4 |
|   |   |   | <u>4-5</u> | <u>5</u> | 3 | <u>4-5</u> | <u>5</u> |
|   |   |   | 5 | 5 | 3 | <u>5</u> | 5 |
|   |   | 100 | <u>4-5</u> | 3-4 | 3 | 4 | <u>4-5</u> |
|   |   |   | 4-5 | 5 | 3 | <u>4-5</u> | 5 |
|   |   |   | 4-5 | 5 | 3 | <u>5</u> | 5 |
|   | PP Top White | 0 | 1 | 2-3 | 1-2 | 1 | 3 |
|   |   |   | 3 | 3 | 1-2 | 3 | 3 |
|   |   |   | 3 | 3 | 1-2 | 3 | 3 |
|   |   | 20 | 3 | <u>4-5</u> | <u>5</u> | 3 | 3 |
|   |   |   | 3 | <u>5</u> | 5 | 3 | 3 |
|   |   |   | 3 | 5 | 5 | 3 | 3-4 |
|   |   | 80 | 4 | 4 | 3 | <u>4-5</u> | 5 |
|   |   |   | <u>4-5</u> | <u>5</u> | 3 | 4-5 | 5 |
|   |   |   | 4-5 | 5 | 3 | 4-5 | 5 |
|   |   | 100 | 3 | 3 | 4 | 3 | 4 |
|   |   |   | 3 | <u>5</u> | 4 | 4 | 4 |
|   |   |   | 3 | 5 | <u>4-5</u> | <u>4-5</u> | 4 |

*The values of 0, 20, 80 and 100 after the substrate indicate the level of corona treatment given to the substrate. The degree of corona treatment is stated as the percentage of the full corona discharge treatment given to the substrate, i.e. 0%, 20%, 80% or 100%. The greater the level of corona treatment given to a substrate the easier it is to gain adhesion.

-continued

| Ink | Monomer | Layer | Print-to-print | Print-to-substrate |
|---|---|---|---|---|
| 3 | DVE-3 | 1 layer | | |
| | | 2 layer | | |
| | | 3 layer | | |
| 4 | ODA | 1 layer | 3/4 | 3 |
| | | 2 layer | 4 | 3 |
| | | 3 layer | 3/4 | 4 |
| 5 | EOEOEA | 1 layer | 4 | 4 |
| | | 2 layer | 4 | 5 |
| | | 3 layer | 4 | 4 |

The results show that the blocking performance of EOEOEA is superior to that of ODA, particularly in the important print-to-substrate tests.

The invention claimed is:

1. A radiation-curable ink-jet ink substantially free of water and volatile organic solvents, having a viscosity of 30 mPas or less at 25° C., the ink comprising:
   at least two monofunctional (meth)acrylate monomers which comprise 10 to 25 wt% of a cyclic monofunctional (meth)acrylate monomer and 5 to 15 wt% of 2-(2-ethoxyethoxy)ethyl acrylate;
   16 to 25 wt% of a monofunctional monomer selected from an N-vinyl amide, an N-acryloyl amine or a mixture thereof;
   5 to 15 wt% of a multifunctional (meth)acrylate monomer;
   5 to 35 wt% a polymerisable (meth)acrylate oligomer;
   a radical photoinitiator; and
   a colouring agent, wherein the percentages by weight are based on the total weight of the ink.

2. An ink-jet ink as claimed in claim 1, wherein the total amount of the at least two monofunctional (meth)acrylate monomers and the at least one monofunctional monomer selected from an N-vinyl amide, an N-acryloyl amine or a mixture thereof is at least 25 wt% based on the total weight of the ink.

3. An ink-jet as claimed in claim 2, wherein the cyclic monofunctional (meth)acrylate monomer is selected from phenoxyethyl acrylate (PEA), cyclic trimethylolpropane formal acrylate (CTFA), isobornyl acrylate (IBOA), tetrahydrofurfuryl acrylate (THFA) and mixtures thereof.

4. An ink-jet ink as claimed in 2 wherein the monomer selected from an N-vinyl amide, an N-acryloyl amine or a mixture thereof, is selected from N-vinyl caprolactam (NVC), N-vinyl pyrrblidone (NVP), N-acryloylmorpholine (ACMO) and mixtures thereof.

5. An ink-jet ink as claimed in claim 1, wherein the cyclic monofunctional (meth)acrylate monomer is selected from phenoxyethyl acrylate (PEA), cyclic trimethylolpropane formal acrylate (CTFA), isobornyl acrylate (IBOA), tetrahydrofurfuryl acrylate (THFA) and mixtures thereof.

6. An ink-jet as claimed in claim 5, wherein the monomer selected from an N-vinyl amide, an N-acryloyl amine or a mixture thereof, is selected from N- vinyl caprolactam (NVC), N-vinyl pyrrolidone (NVP), N-acryloylmorpholine (ACMO) and mixtures thereof.

7. An ink-jet ink as claimed in claim 5, wherein the cyclic monofunctional (meth) acrylate monomer is phenoxyethyl acrylate (PEA).

8. An ink-jet ink as claimed in claim 1, wherein the monomer selected from an N-vinyl amide, an N-acryloyl amine or a mixture thereof, is selected from N- vinyl caprolactam (NVC), N-vinyl pyrrolidone (NVP), N-acryloylmorpholine (ACMO) and mixtures thereof.

9. An ink-jet ink as claimed in claim 1, wherein the multifunctional (meth)acrylate monomer is a difunctional monomer.

10. An ink-jet ink as claimed in claim 1, wherein the polymerisable (meth)acrylate oligomer is has a molecular weight from 450 to 4,000.

11. An ink-jet ink as claimed in claim 1, wherein the polymerisable (meth)acrylate oligomer has a degree of functionality from 2 to 6.

12. An ink-jet ink as claimed in claim 1, wherein the ink is substantially free of acyclic-hydrocarbon monofunctional (meth)acrylate monomer.

13. A method of reel-to-reel ink-jet printing, comprising printing the ink-jet ink as claimed in claim 1 on to a substrate and curing the ink as the substrate is caused to move from a substrate reel to a receiving reel.

14. A method as claimed in claim 13 wherein the substrate is a polyolefin substrate.

15. A method of ink-jet printing, comprising providing an ink-jet printer with a plurality of substrates, printing the ink-jet ink as claimed in claim 1 on to a plurality of the substrates, curing the ink on each of the substrates to produce printed substrates, and stacking the printed substrates.

16. An method as claimed in claim 15, wherein the printer contains a substrate-storage facility having a plurality of substrates held therein.

17. A method as claimed in claim 15, wherein the printer is a flat-bed ink-jet printer.

18. A substrate having the ink-jet ink as claimed in claim 1 printed thereon.

19. A substrate as claimed in claim 18, wherein the substrate is a polyolefin substrate.

20. A radiation-curable ink-jet ink substantially free of water and volatile organic solvents, having a viscosity of 30 mPas or less at 25° C., the ink comprising:
   at least two monofunctional (meth)acrylate monomers which comprise 10 to 25 wt% of a cyclic monofunctional (meth)acrylate monomer selected from phenoxyethyl acrylate (PEA), cyclic trimethylolpropane formal acrylate (CTFA),tetrahydrofurfuryl acrylate (THFA) and mixtures thereof and 5 to 15 wt% of 2-(2-ethoxyethoxy)ethyl acrylate;
   10 to 25 wt% of a monofunctional monomer selected from an N-vinyl amide, an N-acryloyl amine or a mixture thereof;
   5 to 15 wt% of a multifunctional (meth)acrylate monomer;
   5 to 35 wt% a polymerisable (meth)acrylate oligomer;
   a radical photoinitiator; and
   a coloring agent, wherein the percentages by weight are based on the total weight of the ink.

21. An ink-jet ink as claimed in claim 20, wherein the total amount of the at least two monofunctional (meth)acrylate monomers and the at least one monofunctional monomer selected from an N-vinyl amide, an N-acryloyl amine or a mixture thereof is at least 25 wt% based on the total weight of the ink.

22. An ink-jet ink as claimed in claim 20, wherein the monomer selected from an N-vinyl amide, an N-acryloyl amine or a mixture thereof, is selected from N- vinyl caprolactam (NVC), N-vinyl pyrrolidone (NVP), N-acryloylomorpholine (ACMO) and mixtures thereof.

23. An ink-jet ink as claimed in claim 21 wherein the monomer selected from an N-vinyl amide, an N-acryloyl amine or a mixture thereof, is selected from N- vinyl caprolactam (NVC), N-vinyl pyrrolidone (NVP), N-acryloylmorpholine (ACMO) and mixtures thereof.

24. An ink-jet ink as claimed in claim 20, wherein the multifunctional (meth)acrylate monomer is a difunctional monomer.

25. An ink-jet ink as claimed in claim 20, wherein the polymerisable (meth)acrylate oligomer is has a molecular weight from 450 to 4,000.

26. An ink-jet ink as claimed in claim 20, wherein the polymerisable (meth)acrylate oligomer has a degree of functionality from 2 to 6.

27. An ink-jet ink as claimed in claim 20, wherein the ink is substantially free of acyclic-hydrocarbon monofunctional (meth)acrylate monomer.

28. A radiation-curable ink-jet ink substantially free of water and volatile organic solvents, having a viscosity of 30 mPas or less at 25° C., the ink comprising:
  at least two monofunctional (meth)acrylate monomers which comprise about 17 wt% of a phenoxyethyl acrylate (PEA), and about 10 wt% of 2-(2-ethoxyethoxy) ethyl acrylate;
  about 16 wt% of an N-vinyl caprolactam (NVC);
  about 10% wt% of dipropylene glycol diacrylate DPGDA;
  about 29 wt% a polymerisable (meth)acrylate oligomer;
  a radical photoinitiator; and
  a coloring agent, wherein the percentages by weight are based on the total weight of the ink.

29. A method of reel-to-reel ink-jet printing, comprising printing the ink-jet ink as claimed in claim 20 onto a substrate and curing the ink as the substrate is caused to move from a substrate reel to a receiving reel.

30. A method as claimed in claim 29 wherein the substrate is a polyolefin substrate.

31. A method of ink-jet printing, comprising providing an ink-jet printer with a plurality of substrates, printing the ink-jet in as claimed in claim 20 onto a plurality of substrates, curing the ink on each of the substrates to produce printed substrates and stacking the printed substrates.

32. A method as claimed in claim 31, wherein the printer contains a substrate-storage facility having a plurality of substrates held therein.

33. A method as claimed in claim 31, wherein the printer is a flat-bed ink-jet printer.

34. A substrate having the ink-jet ink as claimed in claim 20 printed thereon.

35. A substrate as claimed in claim 34, wherein the substrate is a polyolefin substrate.

* * * * *

UNITED STATES PATENT AND TRADEMARK OFFICE
CERTIFICATE OF CORRECTION

| | | |
|---|---|---|
| PATENT NO. | : 8,377,516 B2 | Page 1 of 1 |
| APPLICATION NO. | : 12/593071 | |
| DATED | : February 19, 2013 | |
| INVENTOR(S) | : Gareth Pratt et al. | |

It is certified that error appears in the above-identified patent and that said Letters Patent is hereby corrected as shown below:

In the Claims

Column 11, line 40 (claim 3), "claim 2" should be --claim 1--

Column 11, line 45 (claim 4), "as claimed in 2" should be --as claimed in claim 2--

Column 12, line 5 (claim 10), "is has" should be --has--

Column 13, line 5 (claim 25), "is has" should be --has--

Column 14, line 11 (claim 31), "in as" should be --as--

Signed and Sealed this
Twenty-fifth Day of November, 2014

Michelle K. Lee
*Deputy Director of the United States Patent and Trademark Office*